United States Patent [19]
Hughes

[11] Patent Number: 5,520,494
[45] Date of Patent: May 28, 1996

[54] EXTENDABLE BOAT TRAILER

[76] Inventor: Billy W. Hughes, 13602 Wicker Ave., Cedar Lake, Ind. 46303

[21] Appl. No.: 378,497

[22] Filed: Jan. 26, 1995

[51] Int. Cl.⁶ ............................................ B60P 3/10
[52] U.S. Cl. .................... 414/477; 280/414.1; 280/482
[58] Field of Search ............................. 414/481, 482, 414/483, 477; 280/414.1, 482

[56] References Cited

U.S. PATENT DOCUMENTS

| | | | |
|---|---|---|---|
| 2,856,087 | 10/1958 | Steber | 280/414.1 X |
| 3,032,353 | 5/1962 | Williams et al. | 280/414.1 |
| 3,083,986 | 4/1963 | Moody et al. | 280/414.1 |
| 3,090,871 | 5/1963 | Gorman | 280/414.1 X |
| 3,102,737 | 9/1963 | Williams et al. | 280/414.1 |
| 3,420,390 | 1/1969 | Taggart | 280/482 X |
| 3,989,266 | 11/1976 | Foster | 280/414.1 |
| 4,232,990 | 11/1980 | Pierce | 280/414.1 X |
| 4,331,346 | 5/1982 | Walters | 280/414.1 |
| 4,623,161 | 11/1986 | Sprague | 414/477 X |
| 4,726,601 | 2/1988 | Stevens | 280/414.1 |
| 5,114,168 | 5/1992 | Kehl | 280/414.1 |
| 5,228,713 | 7/1993 | Kovach | 414/483 X |

*Primary Examiner*—James W. Keenan

[57] ABSTRACT

An extendable boat trailer is comprised of a first length of square tubing secured to a trailer support frame. The first length of square tubing has two apertures therethrough inwardly of an open end portion. A brake light receptacle is secured to an upper portion of the first length of square tubing. The brake light receptacle has a length of wire coupling with a tow vehicle and a trailer's brake lights. A second length of square tubing has three apertures formed therethrough. The second length has a butt plate secured thereto. The second length is adapted to be received within the open end portion of the first length of square tubing with the two apertures thereof selectively aligning with the three apertures of the third length for securement therewith by a fastening device. A trailer hitch is secured to the second length of square tubing. The trailer hitch is adapted for securement to the tow vehicle.

1 Claim, 4 Drawing Sheets

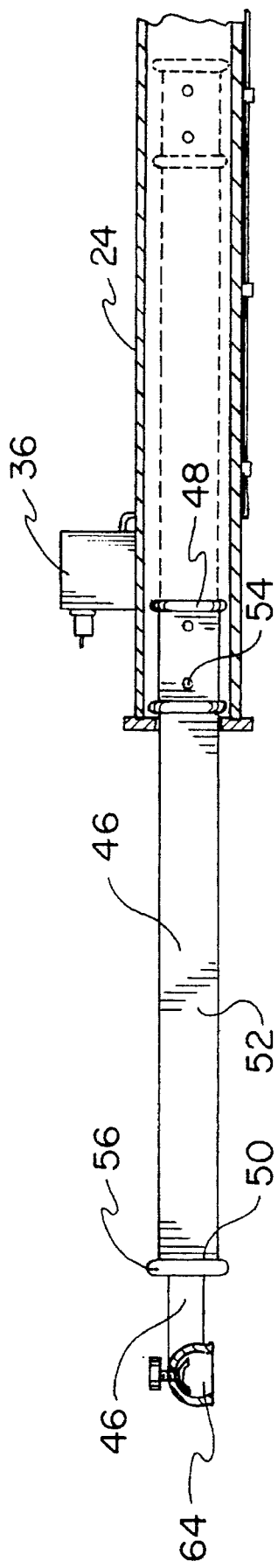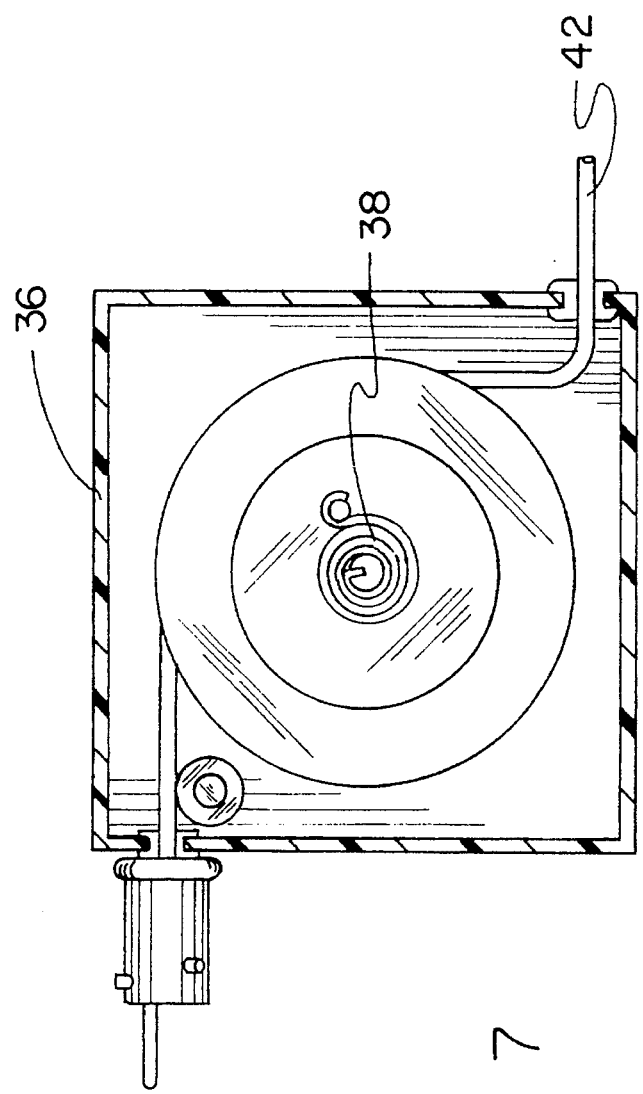
FIG 6
FIG 7

EXTENDABLE BOAT TRAILER

BACKGROUND OF THE INVENTION

1. Field of the Invention

The present invention relates to an extendable boat trailer and more particularly pertains to allowing a trailer hitch to be extended to eliminate the need to back a vehicle a long way to unload a boat with an extendable boat trailer.

2. Description of the Prior Art

The use of boat trailers is known in the prior art. More specifically, boat trailers heretofore devised and utilized for the purpose of launching and loading boats into and from a body of water are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,228,713 to Kovach discloses a boat transporting and launching trailer.

U.S. Pat. No. 5,108,121 to Collis discloses a boat trailer extension arm.

U.S. Pat. No. 4,407,519 to Heyser discloses a boat trailer tongue extender.

U.S. Pat. No. 4,286,906 to Robertson discloses an adjustable balance, extension boat trailer.

U.S. Pat. No. 3,989,266 to Foster discloses a boat trailer.

While these devices fulfill their respective, particular objective and requirements, the aforementioned patents do not describe an extendable boat trailer for allowing a trailer hitch to be extended to eliminate the need to back a vehicle a long way to unload a boat.

In this respect, the extendable boat trailer according to the present invention substantially departs from the conventional concepts and designs of the prior art, and in doing so provides an apparatus primarily developed for the purpose of allowing a trailer hitch to be extended to eliminate the need to back a vehicle a long way to unload a boat.

Therefore, it can be appreciated that there exists a continuing need for new and improved extendable boat trailer which can be used for allowing a trailer hitch to be extended to eliminate the need to back a vehicle a long way to unload a boat. In this regard, the present invention substantially fulfills this need.

SUMMARY OF THE INVENTION

In the view of the foregoing disadvantages inherent in the known types of boat trailers now present in the prior art, the present invention provides an improved extendable boat trailer. As such, the general purpose of the present invention, which will be described subsequently in greater detail, is to provide a new and improved extendable boat trailer and method which has all the advantages of the prior art and none of the disadvantages.

To attain this, the present invention essentially comprises a trailer support frame having a front end, a back end, two side supports, and two wheels. The back end has brake lights thereon. The trailer support frame supports a boat thereon. The device contains a first length of square tubing having a first end and an open second end. The first end is secured to the front end of the trailer support frame. The open second end has a butt plate secured around an outer periphery thereof. The first length of square tubing has two apertures therethrough inwardly of the open second end. A brake light receptacle is secured to an upper portion of the first length of square tubing. The brake light receptacle has a length of wire with a first end and a second end. The first end is adapted to be coupled with a tow vehicle. The second end is adapted to be coupled with the brake lights of the trailer support frame. The device contains a second length of square tubing having a first end, a second end, and an intermediate extent therebetween. The intermediate extent has three apertures formed therethrough. The second end has a butt plate secured thereto. The first end is adapted to be received within the open second end of the first length of square tubing with the two apertures thereof selectively aligning with the three apertures of the intermediate extent for securement therewith by retainer pins with hairpin clips. A trailer hitch is secured to the second end of the second length of square tubing. The trailer hitch is adapted for securement to the tow vehicle.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved extendable boat trailer which has all the advantages of the prior art boat trailers and none of the disadvantages.

It is another object of the present invention to provide a new and improved extendable boat trailer which may be easily and efficiently manufactured and marketed.

It is a further object of the present invention to provide a new and improved extendable boat trailer which is of durable and reliable construction.

An even further object of the present invention is to provide a new and improved extendable boat trailer which is susceptible of a low cost of manufacture with regard to both materials and labor, and which accordingly is then susceptible of low prices of sale to the consuming public, thereby making such an extendable boat trailer economically available to the buying public.

Still yet another object of the present invention is to provide a new and improved extendable boat trailer which provides in the apparatuses and methods of the prior art some of the advantages thereof, while simultaneously overcoming some of the disadvantages normally associated therewith.

Even still another object of the present invention is to provide a new and improved extendable boat trailer for allowing a trailer hitch to be extended to eliminate the need to back a vehicle a long way to unload a boat.

Lastly, it is an object of the present invention to provide a new and improved extendable boat trailer comprised of a first length of square tubing secured to a trailer support frame. The first length of square tubing has two apertures therethrough inwardly of an open end portion. A brake light receptacle is secured to an upper portion of the first length of square tubing. The brake light receptacle has a length of wire coupling with a tow vehicle and a trailer's brake lights. A second length of square tubing has three apertures formed therethrough. The second length has a butt plate secured thereto. The second length is adapted to be received within the open end portion of the first length of square tubing with the two apertures thereof selectively aligning with the three apertures of the third length for securement therewith by a fastening means. A trailer hitch is secured to the second length of square tubing. The trailer hitch adapted for securement to the tow vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is a partial side elevation view of the present invention.

FIG. 7 is a cross-sectional view of the brake light receptacle.

The same reference numerals refer to the same parts through the various Figures.

DESCRIPTION OF THE PREFERRED EMBODIMENT

Figure 1:
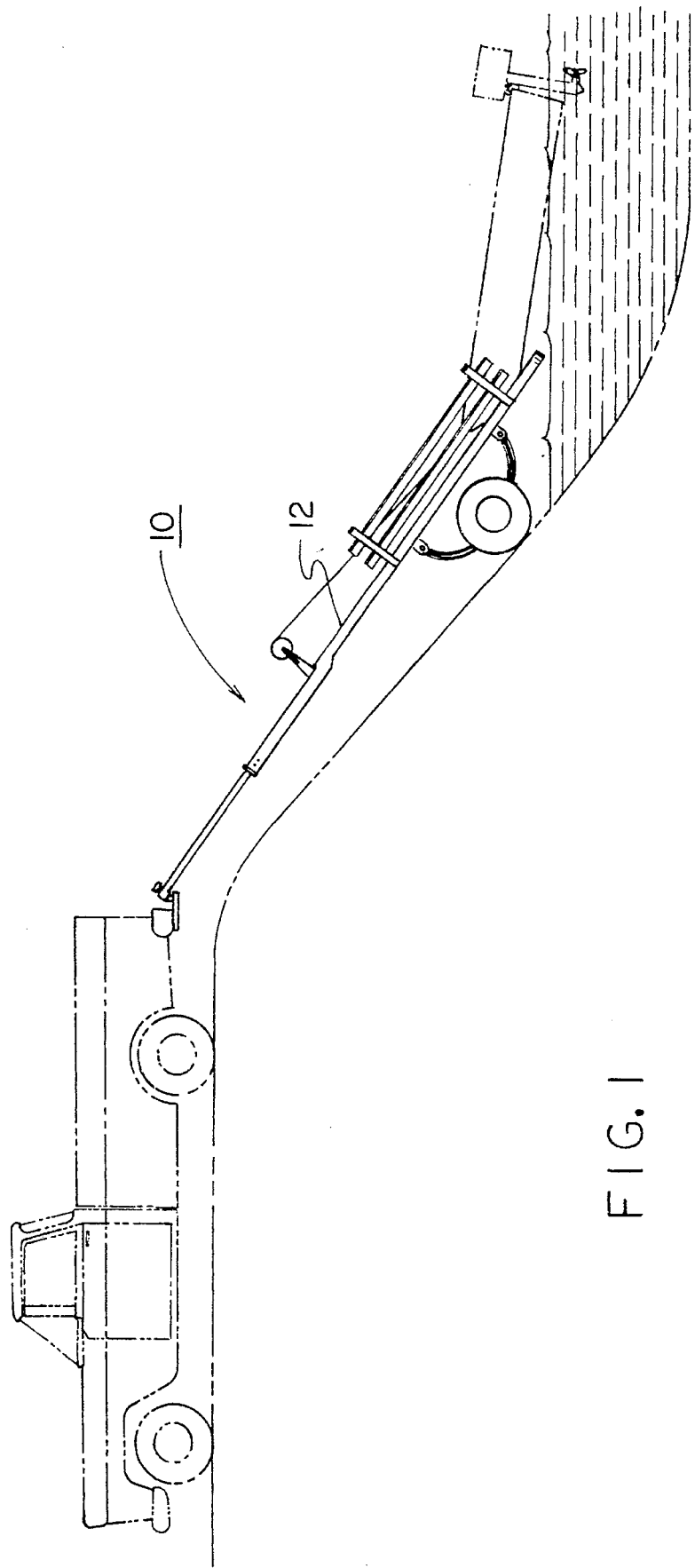
FIG. 1 is a perspective view of the preferred embodiment of the extendable boat trailer constructed in accordance with the principles of the present invention.
Figure 2:
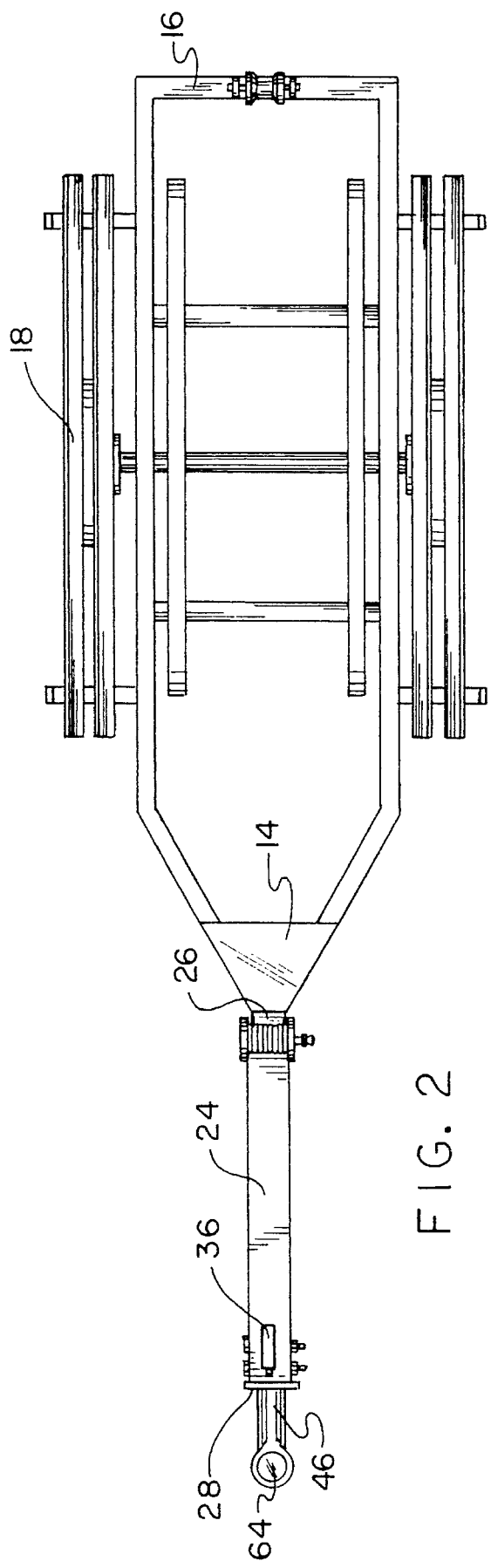
FIG. 2 is a plan view of the preferred embodiment of the present invention.
Figure 3:
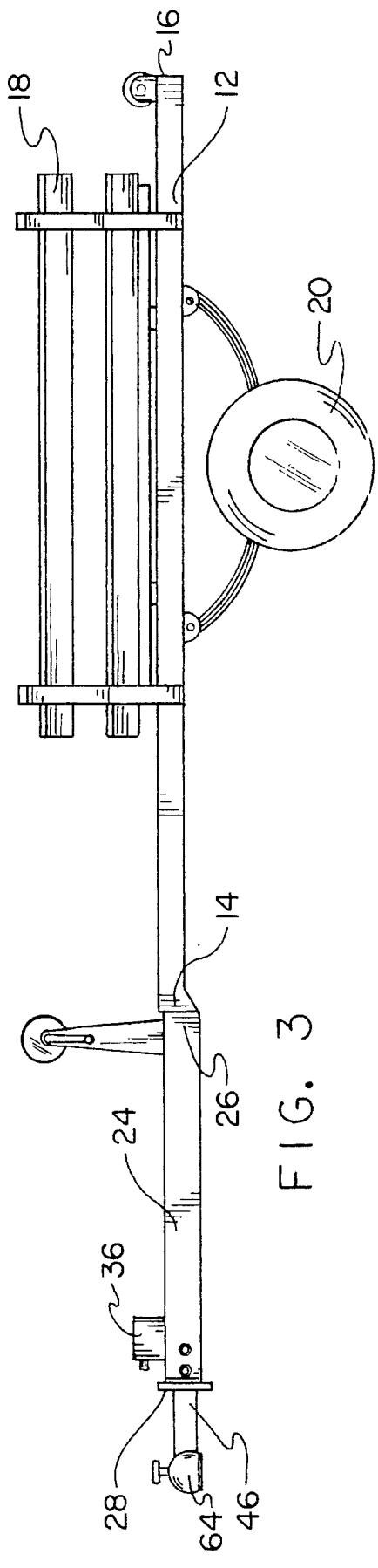
FIG. 3 is a side elevation view of the present invention.
Figure 4:
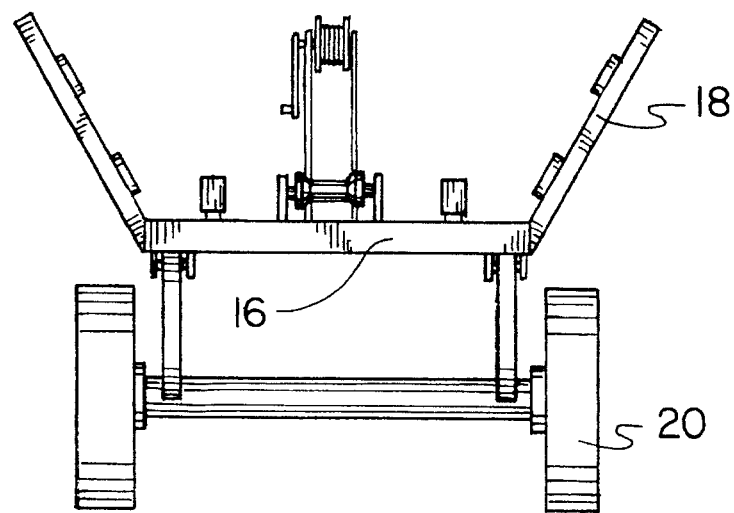
FIG. 4 is a rear elevation view of the present invention.
Figure 5:
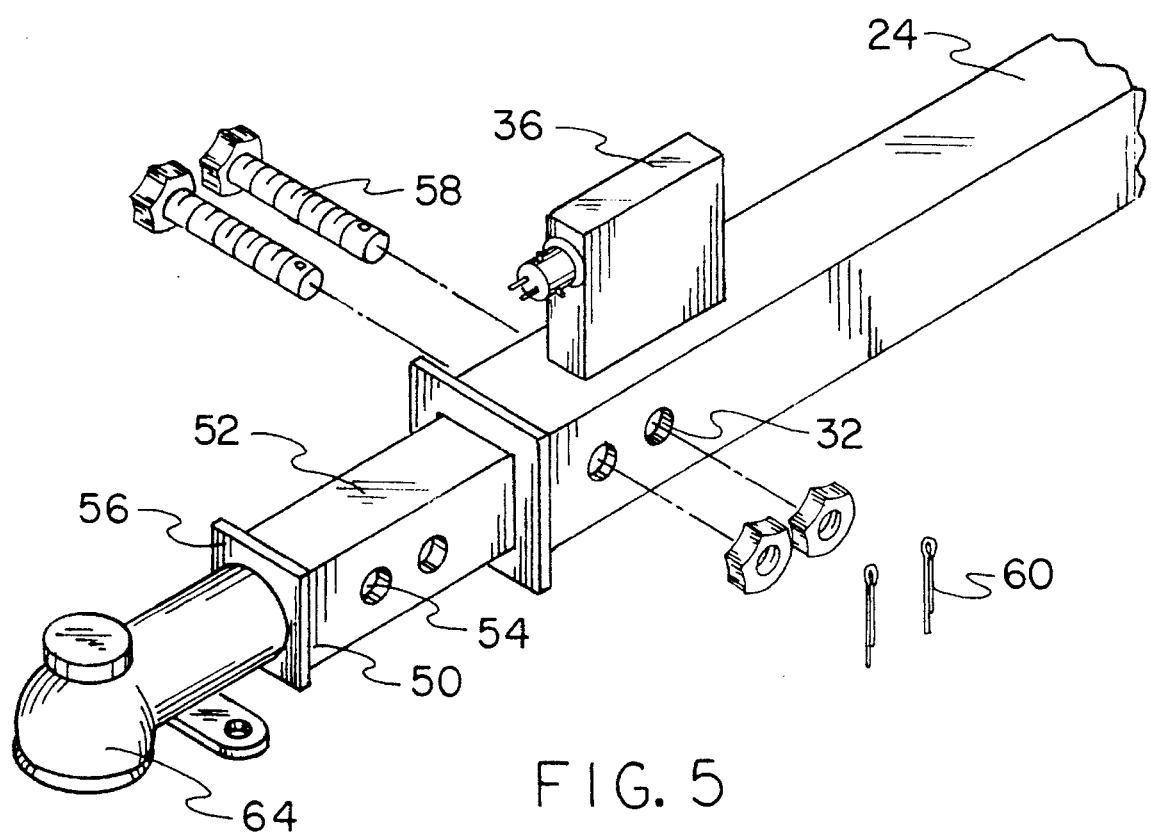
FIG. 5 is a perspective view of the hitch of the present invention.

With reference now to the drawings, and in particular, to FIG. 1 thereof, the preferred embodiment of the new and improved extendable boat trailer embodying the principles and concepts of the present invention and generally designated by the reference number 10 will be described.

Specifically, it will be noted in the various Figures that the device relates to a new and improved extendable boat trailer for allowing a trailer hitch to be extended to eliminate the need to back a vehicle a long way to unload a boat. In its broadest context, the device consists of a trailer support frame, a first length of square tubing, a brake light receptacle, a second length of square tubing, and a trailer hitch.

The device 10 contains a trailer support frame 12 having a front end 14, a back end 16, two side supports 18, and two wheels 20. The back end 16 has brake lights thereon. The trailer support frame 12 supports a boat thereon.

The device 10 contains a first length of square tubing 24 having a first end 26 and an open second end 28. The first end 26 is secured to the front end 14 of the trailer support frame 12. The open second end 28 has a butt plate secured around an outer periphery thereof. The first length of square tubing 24 has two apertures 32 therethrough inwardly of the open second end 28.

A brake light receptacle 36 is secured to an upper portion of the first length of square tubing 24. The brake light receptacle 36 has a length of wire 38 with a first end and a second end 42. The first end is adapted to be coupled with a tow vehicle. The second end 42 is adapted to be coupled with the brake lights of the trailer support frame 12.

The device 10 contains a second length of square tubing 46 having a first end 48, a second end 50, and an intermediate extent 52 therebetween. The intermediate extent 52 has three apertures 54 formed therethrough. The second end 50 has a butt plate 56 secured thereto. The first end 48 is adapted to be received within the open second end 28 of the first length of square tubing 24 with the two apertures 32 thereof selectively aligning with the three apertures 54 of the intermediate extent 52 for securement therewith by retainer pins 58 with hairpin clips 60.

A trailer hitch 64 is secured to the second end 50 of the second length of square tubing 46. The trailer hitch 64 is adapted for securement to the tow vehicle.

The present invention is a trailer tongue extender which allows the user to make the hitch longer on a trailer.

The device 10 consists of two lengths of square tubing 24,46, two retainer pins 58 with hairpin clips 60, a brake light receptacle 36, wiring 38, a butt plate 56, and a trailer hitch 64. All components are made from steel. The body of the mechanism is made from square tubing. One of the lengths of tubing is slightly smaller in cross section than the other and is mounted inside the larger one to produce a telescoping effect. The butt plate 56 fits around the perimeter on the smaller tubing near the trailer hitch 64, and stops the smaller tubing from sliding too far into the larger tubing. Three small apertures 54 for the retainer pins 58 are drilled in the inner tubing and two apertures 32 in the outer tubing. The light receptacle 36 is located near the end of the outer tubing.

The device 10 is welded to the trailer frame 12 on one end and the trailer hitch 64 on the other. It is held in its unextended position by the two retaining pins 58 which fit through the apertures 32,54 drilled in the tubing. To extend it, simply remove these two pins 58 and disconnect the wiring 38. Extend the inner tube until the third hole lines up with the front hole in the outer tubing, and reinsert one of the retainer pins 58.

This extender eliminates backing the vehicle a long way on a soft river or lake bank to unload the boat, especially in situations where no public access for boats exist.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An extendable boat trailer hitch for allowing a trailer to be extended to eliminate the need to back a vehicle to unload a boat comprising, in combination:

a trailer support frame having a front end, a back end, two side supports, and two wheels, the back end having brake lights thereon, the trailer support frame supporting a boat thereon;

a first length of square tubing having a first end and an open second end, the first end secured to the front end of the trailer support frame, the open second end having a butt plate secured around an outer periphery thereof, the first length of square tubing having two apertures therethrough inwardly of the open second end;

a brake light receptacle secured to an upper portion of the first length of square tubing, the brake light receptacle having two lengths of wire comprised of a first wire and a second wire, the first wire adapted to be coupled with a tow vehicle, the first wire being rotatably mounted around a spool within the brake light receptacle whereby the spool allows greater lengths of the first wire to be extended out of the receptacle to reach the tow vehicle, the second wire adapted to be coupled with the brake lights of the trailer support frame;

a second length of square tubing having a first end, a second end, and an intermediate extent therebetween, the intermediate extent having apertures formed therethrough, the second end having a butt plate secured thereto, the first end adapted to be received within the open second end of the first length of square tubing with the two apertures thereof selectively aligning with the apertures of the intermediate extent;

a pair of retainer pins extending through the aligning apertures of the first length of tubing and the second length of tubing, a pair of hairpin clips securing the retainer pins through the aligning apertures;

a trailer hitch secured to the second end of the second length of square tubing, the trailer hitch adapted for securement to the tow vehicle.

* * * * *